M. FAISTENHAMMER.
HAM HOOK.
APPLICATION FILED AUG. 23, 1919.
1,360,103.
Patented Nov. 23, 1920.
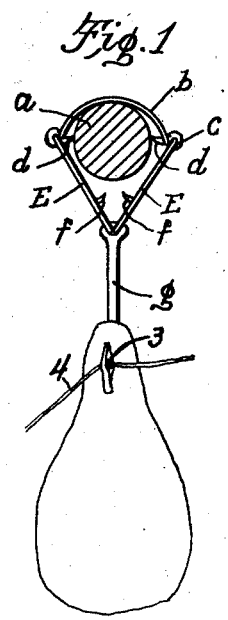
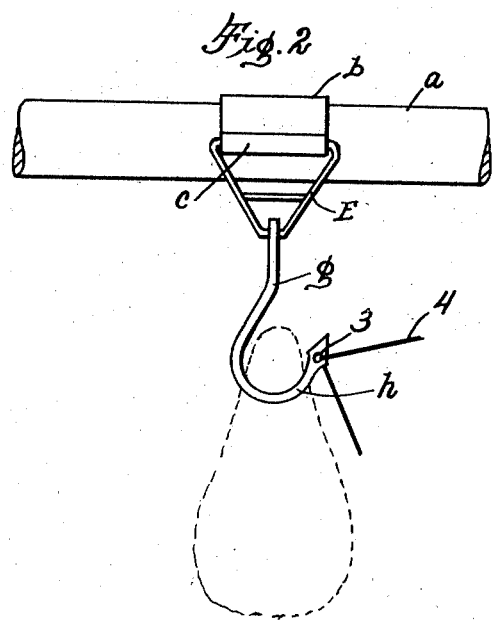
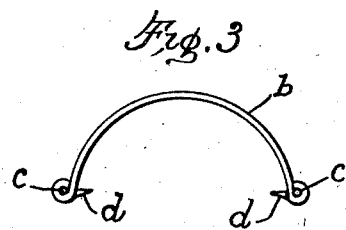
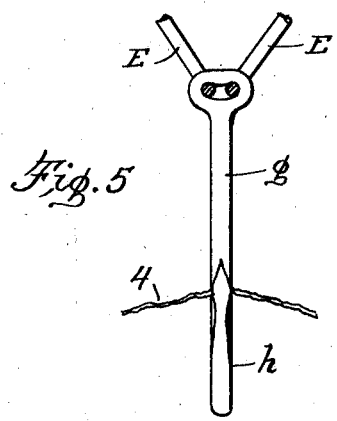

UNITED STATES PATENT OFFICE.

MAX FAISTENHAMMER, OF BINGHAMTON, NEW YORK.

HAM-HOOK.

1,360,103.     Specification of Letters Patent.     Patented Nov. 23, 1920.

Application filed August 23, 1919. Serial No. 319,386.

*To all whom it may concern:*

Be it known that I, MAX FAISTENHAMMER, a citizen of the United States, residing at Binghamton, in the county of Broome and State of New York, have invented certain new and useful Improvements in Ham-Hooks, of which the following is a specification.

My invention relates to improvements in hooks or members for the suspension of hams and similar products from the meat sticks in smoke houses, etc. In the smoking of hams it is necessary to suspend them from hooks, keeping the hams apart from each other, so that they will have the full benefit of the process. The hams are hung on hooks, usually suspended from rails. The hooks are formed rebent at the upper portion, so as to removably hook on the rails. It is customary at much labor, after the hams are smoked to make an opening in the ham and laboriously pass through a cord for suspending the hams for use in the trade. By the great weight upon the rails, it frequently happens that the hams have a tendency to slide down to a central point on the rail, and thus come in contact with each other and thus prevent the freest circulation of air while smoking. My invention is to provide a hook which can be positioned along the rail and remain in a fixed position, as to the next hook and prevent bunching of the hams, and which will permit at the same time, when the ham weight is removed, of being changed in position from point to point; and which will permit, when the hook is removed of simultaneously passing through the ham a cord for looping, to make the ham ready for the trade, without additional labor therefor or the expenditure of time. With these objects in view, my invention consists in certain novel features of construction and arrangement of parts as will be hereinafter fully described and pointed out in the claims, reference being had to the accompanying drawings in which:—

Figure 1, is a front view of hook suspended from rod.

Fig. 2, is a side view of my device.

Fig. 3 is an edge view of a detailed part of my device.

Fig. 4 is a side view in fragment of a part of my device.

Fig. 5 is an enlarged view showing the hook in front elevation and a portion of the suspending means.

The same reference characters denote like parts in each of the several figures of the drawings.

In the drawing $a$ designates the rail or rod, which may be flat or round, as illustrated in the drawing. Over the upper surface of $a$ I have a yielding metallic band $b$ having the curled ends $c, c$ and on the interior of $b$, I have the projecting barbs $d, d;$ hung within the curled ends $c, c$, I have the hangers E, E and projecting from which I have the raised guards $f, f$. I have the hook formed with the usual shank $g$ and hook portion $h$, and which is suspended by means of the hangers E, E, passing through an opening in the shank $g$, and with the hook portion $h$ and through the point of the hook, the eye 3 and through which I pass the cord 4. It is obvious that when several hams are hung on a rod or pole, that its tendency will be to sag, and the hooks slide down to the lowest point in the sag, bringing the hams in contact, and close to each other which is harmful for good results in smoking. In the operation of my device, I pass the hook point through the ham and slide the hanger along the pole to its proper position. I then hook the ham upon it; the weight of the ham causes the band $f$ to bend and the barb $d$ to sink into the pole or rod; thus by this contact holding the hangers in one place. When the ham is released, the band $f$ recoils and releases the barbs $d, d$ from the surface of the pole, and the hook can be again positioned at any given point. While the hook is through the ham, I pass the cord 4 through the eye 3; as I remove the hook from the ham the cord 4 is drawn through the ham, ready for tying in a loop, for trade purposes.

Having thus fully described my invention, what I claim as new and for which I desire Letters Patent is as follows:

1. A device of the class described comprising an article engaging hook, and suspending means for the hook having links loosely connected with the hook, a cross strip of resilient material bridging the space between and having loose connection with the upper end portions of the links, and penetrating prongs for biting into a supporting rail and releasably holding the device against movement longitudinally of the carrying bar passing through the space inclosed by the links and cross strips.

2. A device of the class described comprising a resilient yoke formed of a flat strip having sleeves at its ends, a hook, links having loose connection with the shank of the hook and having cross bars at their upper ends journaled in the sleeves of the yoke strip, and gripping means carried by the links and yoke strip.

In testimony whereof I have affixed my signature.

MAX FAISTENHAMMER.